US012393137B2

(12) United States Patent
Adams et al.

(10) Patent No.: US 12,393,137 B2
(45) Date of Patent: Aug. 19, 2025

(54) TONER CONTAINER HAVING A SHUTTER LOCK MECHANISM

(71) Applicant: LEXMARK INTERNATIONAL, INC., Lexington, KY (US)

(72) Inventors: Emily Stefano Adams, Lexington, KY (US); Brian Lester Boettcher, Versailles, KY (US); Brian Lee Hawes, Versailles, KY (US); Brittany Nicole Sexton, Lexington, KY (US); Glen Alan Reidhaar, Lexington, KY (US); Edward Lynn Triplett, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 18/415,123

(22) Filed: Jan. 17, 2024

(65) Prior Publication Data

US 2025/0044722 A1 Feb. 6, 2025

Related U.S. Application Data

(60) Provisional application No. 63/532,245, filed on Aug. 11, 2023, provisional application No. 63/465,062, filed on May 9, 2023, provisional application No. 63/449,643, filed on Mar. 3, 2023.

(51) Int. Cl.
*G03G 15/08* (2006.01)
*G03G 21/16* (2006.01)

(52) U.S. Cl.
CPC ..... *G03G 15/0886* (2013.01); *G03G 21/1676* (2013.01); *G03G 2215/0692* (2013.01); *G03G 2221/1654* (2013.01)

(58) Field of Classification Search
CPC ........... G03G 15/0886; G03G 21/1676; G03G 2215/0692; G03G 2221/1654
See application file for complete search history.

(56) References Cited

U.S. PATENT DOCUMENTS

| | | | |
|---|---|---|---|
| 5,614,996 | A | 3/1997 | Tanda |
| 7,548,710 | B2 | 6/2009 | Gayne et al. |
| 7,606,520 | B2 | 10/2009 | Dawson et al. |
| 8,238,799 | B2 | 8/2012 | Dawson et al. |
| 8,737,887 | B2 | 5/2014 | Cavill et al. |
| 8,913,927 | B2 | 12/2014 | Oda et al. |
| 8,948,650 | B2 | 2/2015 | Newman et al. |

(Continued)

OTHER PUBLICATIONS

International Search Report and Written Opinion of the International Searching Authority dated Jun. 17, 2024 for PCT Application No. PCT/US24/16353.

*Primary Examiner* — Sophia S Chen

(57) ABSTRACT

A toner container for use in an image forming device according to one example embodiment includes a body having a reservoir for holding toner, a toner port on the body in fluid communication with the reservoir, and a shutter translatable along a first dimension between a closed position blocking the toner port and an open position unblocking the toner port. A lock is translatable along a second dimension orthogonal to the first dimension between a locked position blocking the shutter from moving from the closed position to the open position and an unlocked position unblocking the shutter permitting the shutter to move from the closed position to the open position.

25 Claims, 12 Drawing Sheets

(56) References Cited

U.S. PATENT DOCUMENTS

| | | | |
|---|---|---|---|
| 8,948,659 | B2 | 2/2015 | Baker et al. |
| 9,031,451 | B2 | 5/2015 | Rulon et al. |
| 9,104,141 | B2 | 8/2015 | Buchanan et al. |
| 9,146,497 | B2 | 9/2015 | Nodera et al. |
| 9,477,177 | B2 | 10/2016 | Leemhuis et al. |
| 9,933,727 | B2 | 4/2018 | Reidhaar |
| 2010/0166460 | A1 | 7/2010 | Maeshima |
| 2011/0052266 | A1 | 3/2011 | Yoon et al. |
| 2012/0257912 | A1 | 10/2012 | Hasebe |
| 2013/0121731 | A1 | 5/2013 | Takashima |
| 2013/0121732 | A1 | 5/2013 | Takashima |
| 2017/0060029 | A1 | 3/2017 | Yomoda |
| 2022/0317593 | A1* | 10/2022 | Higashimura ..... G03G 15/0886 |

* cited by examiner

TONER CONTAINER HAVING A SHUTTER LOCK MECHANISM

CROSS REFERENCES TO RELATED APPLICATIONS

This application claims priority to U.S. Provisional Patent Application Ser. No. 63/449,643, filed Mar. 3, 2023, entitled "Toner Cartridge and Developer Unit Shutter Interface," U.S. Provisional Patent Application Ser. No. 63/465,062, filed May 9, 2023, entitled "Toner Container Having a Shutter Lock," and U.S. Provisional Patent Application Ser. No. 63/532,245, filed Aug. 11, 2023, entitled "Toner Container Having a Shutter Lock Mechanism," the contents of which are hereby incorporated by reference in their entirety.

BACKGROUND

1. Field of the Disclosure

The present disclosure relates generally to image forming devices and more particularly to a toner container having a shutter lock mechanism.

2. Description of the Related Art

During the electrophotographic printing process, an electrically charged rotating photoconductive drum is selectively exposed to a laser beam. The areas of the photoconductive drum exposed to the laser beam are discharged, creating an electrostatic latent image of a page to be printed on the photoconductive drum. Toner particles are then electrostatically picked up by the latent image on the photoconductive drum, creating a toned image on the drum. The toned image is transferred to the print media (e.g., paper) either directly by the photoconductive drum or indirectly by an intermediate transfer member. The toner is then fused to the media using heat and pressure to complete the print.

The image forming device's toner supply is typically stored in one or more replaceable units having a shorter lifespan than the image forming device. It is important to prevent the unwanted release of toner from these replaceable units. Some image forming devices include a first replaceable unit in the form of a toner cartridge that holds a main toner supply of the image forming device and feeds toner through an outlet port of the toner cartridge to an inlet port of a second replaceable unit, sometimes referred to as an imaging unit. The toner cartridge may include a shutter that seals the outlet port when the toner cartridge is not installed in the image forming device. The shutter may be biased toward a closed position in order to prevent the undesired release of toner. As the toner cartridge is inserted into the image forming device and the outlet port of the toner cartridge mates with the corresponding inlet port, an engagement feature in the image forming device opens the shutter so that toner may be delivered through the outlet port. Toner leakage may be experienced if the shutter opens when the outlet port is not mated with the corresponding inlet port, such as if the shutter opens prematurely during insertion of the toner cartridge into the image forming device or if a user unintentionally opens the shutter or intentionally opens the shutter without appreciating its purpose. Leaked toner may cause uncleanliness, which customers disfavor, and in some instances, contamination of electrophotographic components and print defects. Accordingly, it will be appreciated that a mechanism that prevents the unwanted release of toner from the outlet port of the toner cartridge is desired.

SUMMARY

A toner container for use in an image forming device according to one example embodiment includes a body having a reservoir for holding toner, a toner port on the body in fluid communication with the reservoir, and a shutter translatable along a first dimension between a closed position blocking the toner port and an open position unblocking the toner port. A lock is translatable along a second dimension orthogonal to the first dimension between a locked position blocking the shutter from moving from the closed position to the open position and an unlocked position unblocking the shutter permitting the shutter to move from the closed position to the open position. In one embodiment, the first dimension is a horizontal dimension, and the second dimension is a vertical dimension. In some embodiments, the lock moves upward when the lock moves from the locked position to the unlocked position, and the lock moves downward when the lock moves from the unlocked position to the locked position.

Embodiments include those wherein the lock includes a locking arm having a blocking surface. The locking arm is movable between the locked position where the blocking surface is positioned in a path of the shutter blocking the shutter from moving from the closed position to the open position and the unlocked position where the blocking surface is positioned clear from the path of the shutter permitting the shutter to move from the closed position to the open position. In some embodiments, the locking arm is spaced from the shutter when the lock is in the unlocked position and the shutter is in the open position. In some embodiments, the locking arm contacts the shutter when the lock is in the unlocked position and the shutter is in the open position. Embodiments also include those wherein the lock includes a camming surface positioned to receive a force from a corresponding surface in the image forming device that causes the lock to move from the locked position to the unlocked position during installation of the toner container into the image forming device.

A toner container for use in an image forming device according to another example embodiment includes a body having a reservoir for holding toner, a toner port on the body in fluid communication with the reservoir, and a shutter translatable along a horizontal dimension between a closed position blocking the toner port and an open position unblocking the toner port. A lock is movable upward and downward between a locked position blocking the shutter from moving from the closed position to the open position and an unlocked position permitting the shutter to move from the closed position to the open position. In one embodiment, the lock is translatable upward and downward between the locked position and the unlocked position. In some embodiments, the lock moves upward when the lock moves from the locked position to the unlocked position, and the lock moves downward when the lock moves from the unlocked position to the locked position. In some embodiments, the lock is translatable along a vertical dimension orthogonal to the horizontal dimension.

A toner container for use in an image forming device according to another example embodiment includes a body having a top, a bottom, a first side and a second side positioned between a first longitudinal end and a second longitudinal end of the body. A longitudinal dimension of the toner container that is orthogonal to a vertical dimension of the toner container extends between the first longitudinal end of the body and the second longitudinal end of the body. The first longitudinal end of the body leads during insertion of the toner container into the image forming device and the second longitudinal end of the body trails during insertion of the toner container into the image forming device. The body has a reservoir for holding toner. An outlet port is disposed on the bottom of the body for exiting toner from the reservoir. A shutter is movable along the longitudinal dimension of the body between a closed position blocking the outlet port and an open position unblocking the outlet port. The shutter moves in a direction away from the first longitudinal end of the body and toward the second longitudinal end of the body when the shutter moves from the closed position to the open position and the shutter moves in a direction away from the second longitudinal end of the body and toward the first longitudinal end of the body when the shutter moves from the open position to the closed position. A lock is positioned on the first side of the body and is movable along the vertical dimension of the body between a locked position blocking the shutter from moving from the closed position to the open position and an unlocked position permitting the shutter to move from the closed position to the open position.

In some embodiments, the lock is translatable along the vertical dimension of the body between the locked position and the unlocked position. In some embodiments, the shutter is translatable along the longitudinal dimension of the body between the closed position and the open position. In some embodiments, the lock moves upward when the lock moves from the locked position to the unlocked position, and the lock moves downward when the lock moves from the unlocked position to the locked position.

Embodiments include those wherein the lock includes a locking arm having a blocking surface. The locking arm is movable between the locked position where the blocking surface is positioned in a path of the shutter blocking the shutter from moving from the closed position to the open position and the unlocked position where the blocking surface is positioned clear from the path of the shutter permitting the shutter to move from the closed position to the open position. Embodiments also include those wherein the lock includes a camming surface for contacting a corresponding surface in the image forming device during insertion of the toner container into the image forming device and receiving an actuation force from the corresponding surface in the image forming device to move the lock from the locked position to the unlocked position. In some embodiments, the camming surface is positioned on an engagement arm of the lock spaced apart from the locking arm. In some embodiments, the engagement arm and the locking arm extend downward from the lock.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense, and the scope of the present disclosure is defined only by the appended claims and their equivalents.

Figure 1:
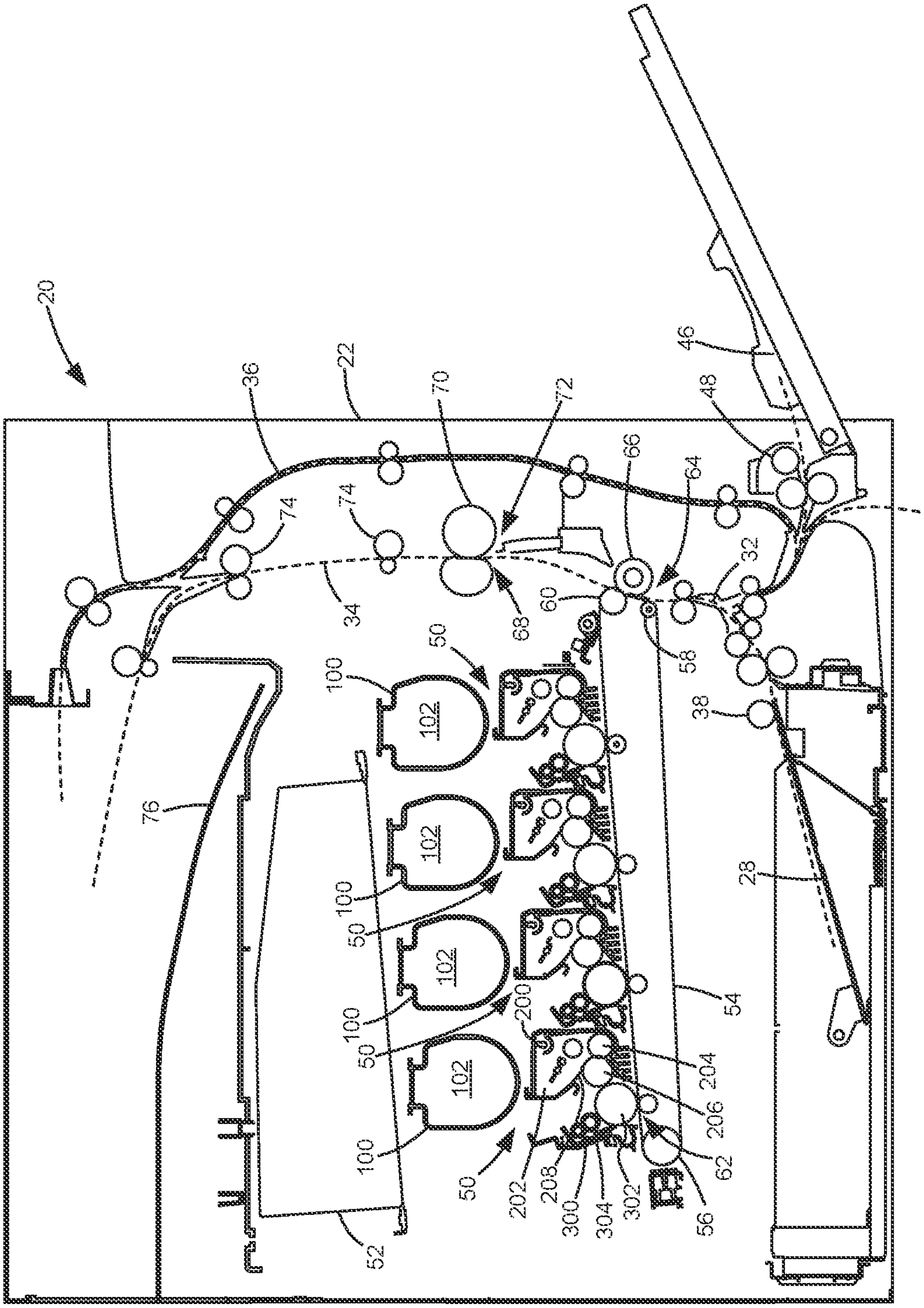
FIG. 1 is a schematic view of an image forming device according to one example embodiment.

FIG. 1 illustrates a schematic view of the interior of an example image forming device 20. Image forming device 20 includes a housing 22. Housing 22 includes one or more input trays 28 positioned therein. Each tray 28 is sized to contain a stack of media sheets. As used herein, the term media is meant to encompass not only paper but also labels, envelopes, fabrics, photographic paper and any other desired substrate. Trays 28 are preferably removable for refilling. A control panel may be located on housing 22. Using the control panel, a user is able to enter commands and generally control the operation of image forming device 20. For example, a user may enter commands to switch modes (e.g., color mode, monochrome mode), view the number of images printed, etc. A media path 32 extends through image forming device 20 for moving the media sheets through the image transfer process. Media path 32 includes a simplex path 34 and may include a duplex path 36. A media sheet is introduced into simplex path 34 from tray 28 by a pick mechanism 38. In the example embodiment shown, pick mechanism 38 includes a roll positioned to move the media sheet from tray 28 and into media path 32. The media sheet is then moved along media path 32 by various transport rollers. Media sheets may also be introduced into media path 32 by a manual feed 46 having one or more rolls 48 or by additional media trays.

Image forming device 20 includes an image transfer section that includes one or more imaging stations 50. Each imaging station 50 includes a toner cartridge 100, a developer unit 200 and a photoconductive unit (PC unit) 300. Each toner cartridge 100 includes a reservoir 102 for holding toner and an outlet port in communication with an inlet port of a corresponding developer unit 200 for transferring toner from reservoir 102 to developer unit 200 as discussed in greater detail below. In the example embodiment illustrated, developer unit 200 utilizes what is commonly referred to as a single component development system. In this embodiment, each developer unit 200 includes a toner reservoir 202 and a toner adder roll 204 that moves toner from reservoir 202 to a developer roll 206. In another embodiment, developer unit 200 utilizes what is commonly referred to as a dual component development system. In this embodiment, toner in toner reservoir 202 is mixed with magnetic carrier beads. The magnetic carrier beads may be coated with a polymeric film to provide triboelectric properties to attract toner to the carrier beads as the toner and the magnetic carrier beads are mixed in the toner reservoir. In this embodiment, developer roll 206 attracts the magnetic carrier beads having toner thereon to developer roll 206 through the use of magnetic fields. Each PC unit 300 includes a charging roll 304 and a photoconductive (PC) drum 302 for each imaging station 50. PC drums 302 are mounted substantially parallel to each other. For purposes of clarity, developer unit 200 and PC unit 300 are labeled on only one of the imaging stations 50 in FIG. 1. In the example embodiment illustrated, each imaging station 50 is substantially the same except for the color or type of toner contained therein.

Each charging roll 304 forms a nip with the corresponding PC drum 302. During a print operation, charging roll 304 charges the surface of PC drum 302 to a specified voltage. A laser beam from a printhead 52 associated with each imaging station 50 is then directed to the surface of PC drum 302 and selectively discharges those areas it contacts to form a latent image. Developer roll 206 then transfers toner to PC drum 302 to form a toner image. A metering device, such as a doctor blade 208, may be used to meter toner on developer roll 206 and apply a desired charge to the toner prior to its transfer to PC drum 302. Toner is attracted to the areas of PC drum 302 surface discharged by the laser beam from printhead 52.

In the example embodiment illustrated, an intermediate transfer mechanism (ITM) 54 is disposed adjacent to imaging stations 50. In this embodiment, ITM 54 is formed as an endless belt trained about a drive roll 56, a tension roll 58 and a back-up roll 60. During print operations, ITM 54 moves past imaging stations 50 in a counterclockwise direction as viewed in FIG. 1. One or more of PC drums 302 apply toner images in their respective colors to ITM 54 at a first transfer nip 62. ITM 54 rotates and collects the one or more toner images from imaging stations 50 and then conveys the toner images to a media sheet advancing through simplex path 34 at a second transfer nip 64 formed between a transfer roll 66 and ITM 54, which is supported by back-up roll 60. In other embodiments, the toner image is transferred to the media sheet directly by the PC drum(s) 302.

The media sheet with the toner image is then moved along the media path 32 and into a fuser area 68. Fuser area 68 includes fusing rolls or belts 70 that form a nip 72 to adhere the toner image to the media sheet. The fused media sheet then passes through transport rolls 74 located downstream from fuser area 68, which move the media sheet to an output area 76 of image forming device 20 or to duplex path 36 for image formation on a second side of the media sheet, as desired.

A monocolor image forming device 20 may include a single imaging station 50, as compared to a color image forming device 20 that may include multiple imaging stations 50.

Figure 2A:
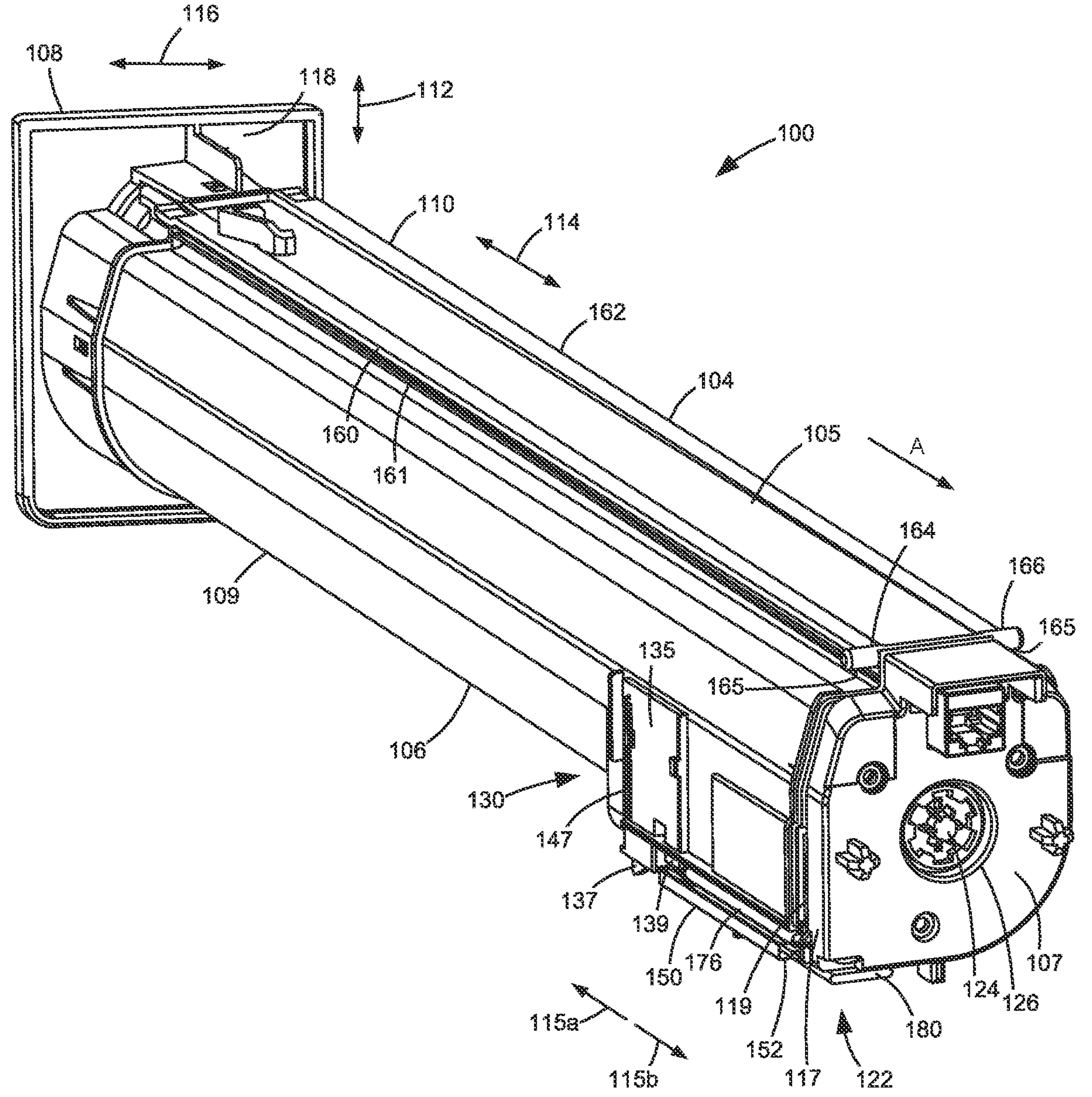
FIGS. 2A and 2B are perspective views of a toner cartridge according to one example embodiment.
Figure 2B:
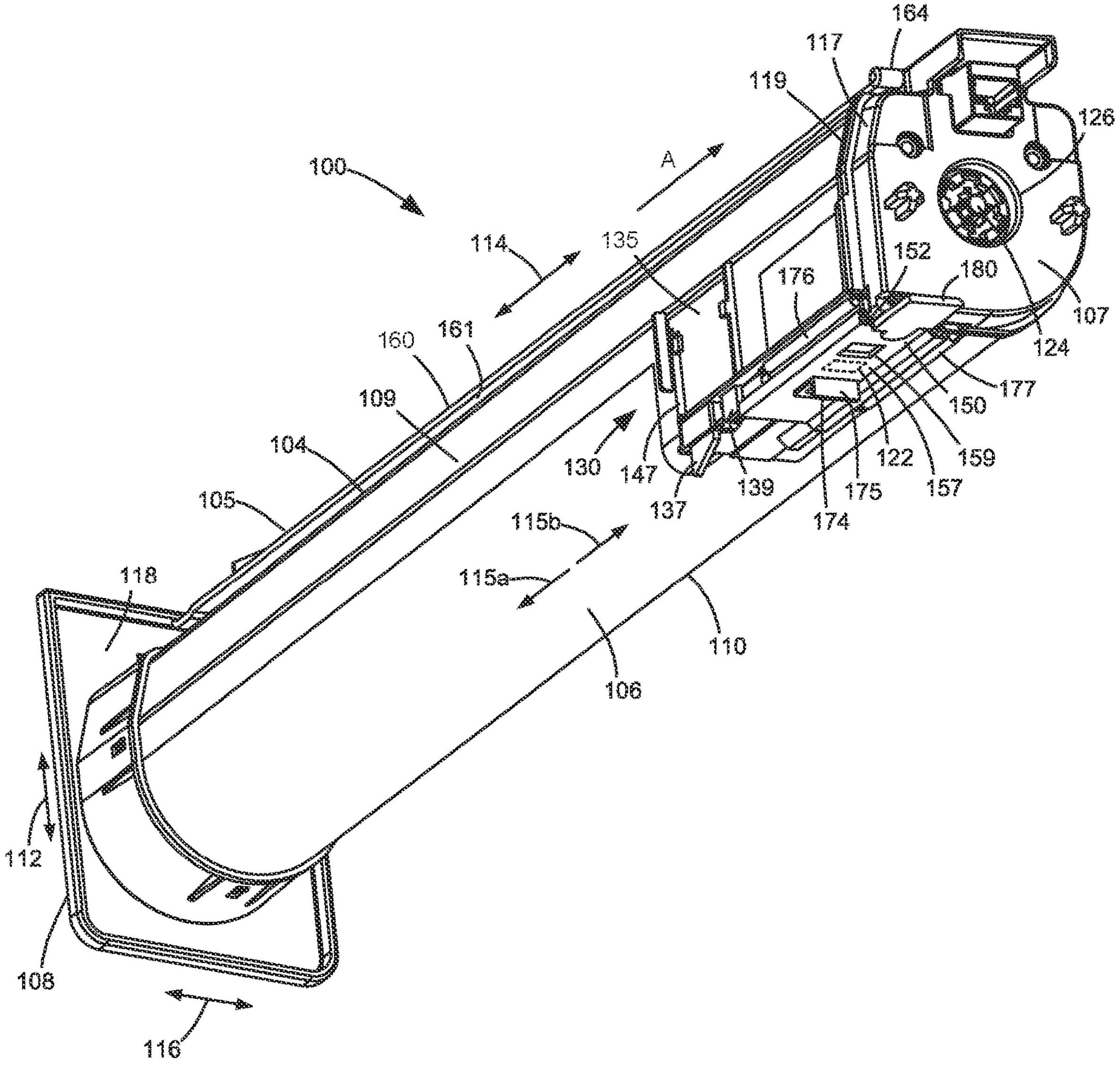

FIGS. 2A and 2B show toner cartridge 100 according to one example embodiment. Toner cartridge 100 includes a body 104 housing toner reservoir 102 therein. Body 104 includes a top 105, a bottom 106, a front end 107, a rear end 108 and a pair of sides 109, 110. Body 104 has a height measured along a vertical dimension 112 of toner cartridge 100 between top 105 and bottom 106, a length measured along a longitudinal dimension 114 of toner cartridge 100 orthogonal to vertical dimension 112 between front end 107 and rear end 108, and a width measured along a side-to-side dimension 116 of toner cartridge 100 orthogonal to vertical dimension 112 and longitudinal dimension 114 between side 109 and side 110. In the example embodiment illustrated, each end 107, 108 of body 104 includes a respective end cap 117, 118 mounted on a corresponding end wall, such as by suitable fasteners (e.g., screws, rivets, etc.) or by a snap-fit engagement. In this embodiment, an end wall 119 at front end 107 and an end wall (not shown) at rear end 108 along with top 105, bottom 106 and sides 109, 110 form toner reservoir 102. In the example embodiment illustrated, toner cartridge 100 is inserted into image forming device 20 generally along longitudinal dimension 114 in the direction indicated by arrow A in FIGS. 2A and 2B with front end 107 of body 104 leading and rear end 108 of body 104 trailing.

As used herein, the terms "front" and "rear" correspond to the direction of travel of toner cartridge 100 during insertion of toner cartridge 100 into image forming device 20 rather than any particular orientation of image forming device 20. For example, in one embodiment, image forming device 20 is primarily operated, for example, accessing a user interface, media tray(s), supply item(s) (such as toner cartridge 100, developer unit 200, and PC unit 300) and other features of image forming device 20, at a side proximate to rear end 108 of body 104 of toner cartridge 100.

Toner cartridge 100 includes an outlet port 122 for exiting toner from reservoir 102, such as when transferring toner to an inlet port of developer unit 200. In the example embodiment illustrated, outlet port 122 is formed as a downward facing opening on bottom 106 of body 104, next to front end 107 of body 104, such as next to an inner side of end wall 119. A shutter 150 is positioned at outlet port 122 to regulate whether toner is permitted to flow from reservoir 102 out of outlet port 122. Shutter 150 may be referred to herein as cartridge shutter 150. Cartridge shutter 150 is positioned on bottom 106 of body 104 and is translatable between a closed position blocking outlet port 122 to prevent toner from escaping toner cartridge 100 and an open position unblocking outlet port 122 to permit toner to flow from outlet port 122 of toner cartridge 100. In this embodiment, cartridge shutter 150 moves in a front-to-rear direction 115*a* relative to body 104 as shutter moves from the closed position to the open position and in a rear-to-front direction 115*b* relative to body 104 as cartridge shutter 150 moves from the open position to the closed position. In the embodiment illustrated, cartridge shutter 150 includes a blocking portion 157 and a window 159. Blocking portion 157 blocks outlet port 122 when cartridge shutter 150 is in the closed position as shown in FIG. 2B. When cartridge shutter 150 is in the open position, such as after moving in the front-to-rear direction 115*a* from the closed position, window 159 aligns with outlet port 122 to allow toner to exit outlet port 122.

Cartridge shutter 150 is biased toward the closed position blocking outlet port 122. In the embodiment illustrated, one or more biasing springs, such as extension springs 176, 177 bias cartridge shutter 150 towards the closed position. In the embodiment illustrated, each spring 176, 177 has one end connected to a portion of body 104 and another end connected to cartridge shutter 150. While the example embodiment illustrated includes extension springs 176, 177, it will be appreciated that cartridge shutter 150 may be biased relative to body 104 by any suitable biasing member as desired, including, for example, one or more compression springs, torsion springs, leaf springs, or other materials having resilient properties.

Cartridge shutter 150 includes a first engagement feature that contacts and pushes open a second shutter of a toner port that is configured to mate with outlet port 122 of toner cartridge 100 during insertion of toner cartridge 100 into image forming device 20. In the embodiment illustrated, cartridge shutter 150 includes a projection 174 projecting downward near a surface of blocking portion 157. In the embodiment illustrated, outlet port 122 is positioned closer to front end 107 of body 104 than projection 174 is to front end 107 of body 104. In addition, window 159 is positioned closer to front end 107 of body 104 than projection 174 is to front end 107 of body 104. Projection 174 has a front face 175 that faces toward front end 107 of body 104. In this embodiment, front face 175 of projection 174 is unobstructed such that front face 175 of projection 174 contacts at least a portion of the second shutter positioned along the insertion path of projection 174 in order for projection 174 to contact and push open the second shutter in direction of insertion A of toner cartridge 100 into image forming device 20 during insertion of toner cartridge 100 into image forming device 20, as discussed below.

Cartridge shutter 150 also includes a second engagement feature that engages a corresponding surface in image forming device 20 to open cartridge shutter 150 when toner cartridge 100 is inserted into image forming device 20. In the embodiment illustrated, cartridge shutter 150 includes an extension 180 that protrudes from a front end 152 of cartridge shutter 150 toward and beyond front end 107 of body 104 along longitudinal dimension 114 for contacting a corresponding surface in image forming device 20 during insertion of toner cartridge 100 into image forming device 20. In one embodiment, the corresponding surface in image forming device 20 may be a portion of a basket or tray that holds developer unit 200 in image forming device 20. In another embodiment, the corresponding surface may be an inner wall or frame within image forming device 20. Extension 180 is positioned to receive an actuation force from the corresponding surface in image forming device 20 to move cartridge shutter 150 along longitudinal dimension 114 in front-to-rear direction **115*a* of body 104 from the closed position to the open position. Extension 180 extends forward, for example, in a cantilevered manner, from front end 152 of cartridge shutter 150 along longitudinal dimension 114 in the direction of insertion A of toner cartridge 100 into image forming device 20. When cartridge shutter 150 is in the closed position, extension 180 extends further forward along longitudinal dimension 114 than front end 107 and/or drive coupler 124 of toner cartridge 100 in order to contact the corresponding surface in image forming device 20. In the embodiment illustrated, window 159 is positioned between extension 180 and projection 174 of cartridge shutter 150**.

Toner cartridge 100 includes a shutter lock 130 that prevents cartridge shutter 150 from opening unless toner cartridge 100 is installed in image forming device 100. In the embodiment illustrated, shutter lock 130 is positioned on side 109 of body 104 of toner cartridge 100 adjacent to cartridge shutter 150. Shutter lock 130 is translatable along vertical dimension 112 between a lowered position blocking cartridge shutter 150 to prevent cartridge shutter 150 from moving from the closed position to the open position and a raised position unblocking cartridge shutter 150 to permit cartridge shutter 150 to move from the closed position to the open position, as discussed in greater detail below.

Toner cartridge 100 also includes a drive coupler 124 that mates with and receives rotational power from a corresponding drive coupler in image forming device 20 when toner cartridge 100 is installed in image forming device 20 in order to provide rotational power to various rotatable components of toner cartridge 100, such as toner agitators positioned within reservoir 102 for moving toner to outlet port 122. In the example embodiment illustrated, drive coupler 124 is positioned on front end 107 of body 104, for example, higher than outlet port 122. In the embodiment illustrated, drive coupler 124 is positioned on an outer surface of end wall 119 and exposed through an opening 126 in end cap 117 such that drive coupler 124 is unobstructed to mate with the corresponding drive coupler in image forming device 20 when toner cartridge 100 is installed in image forming device 20.

In the example embodiment illustrated, toner cartridge 100 includes a pair of guide rails 160, 162 that extend along longitudinal dimension 114 of toner cartridge 100 at top 105 of body 104. In this embodiment, guide rails 160, 162 are formed as cantilevered extensions that extend outward in opposite directions along side-to-side dimension 116 of toner cartridge 100 at top 105 of body 104. Specifically, guide rail 160 extends along side-to-side dimension 116 toward side 109 of body 104, and guide rail 162 extends along side-to-side dimension 116 toward side 110 of body 104. Each guide rail 160, 162 includes a bottom contact surface 161 that is positioned to contact and ride along the top surface of a corresponding guide rail positioned at an entrance of toner cartridge 100 to image forming device 20 during insertion of toner cartridge 100 into image forming device 20 in order to guide insertion of toner cartridge 100 into image forming device 20 in the direction indicated by arrow A in FIGS. 2A and 2B with front end 107 of body 104 leading and rear end 108 of body 104 trailing. In the example embodiment illustrated, guide rails 160, 162 run along nearly the entire length of body 104 of toner cartridge 100 along longitudinal dimension 114 of toner cartridge 100, from end wall 119 at front end 107 of body 104 to an inner end of end cap 118 at rear end 108 of body 104.

In the example embodiment illustrated, respective guide pins or posts 164, 166 project outward in opposite directions along side-to-side dimension 116 of toner cartridge 100 at a front end of each guide rail 160, 162. Specifically, guide post 164 extends along side-to-side dimension 116 toward side 109 of body 104, and guide post 166 extends along side-to-side dimension 116 toward side 110 of body 104. Guide posts 164, 166 extend further outward along side-to-side dimension 116 of toner cartridge 100 than guide rails 160, 162. In this embodiment, guide posts 164, 166 are positioned at end wall 119 at front end 107 of body 104. Each guide post 164, 166 includes a bottom contact surface 165 that is positioned to contact and ride along the top surface of a corresponding guide rail that runs along the length of a guide slot that receives toner cartridge 100 in image forming device 20 during insertion of toner cartridge 100 into image forming device 20 in order to further guide insertion of toner cartridge 100 into image forming device 20 in the direction indicated by arrow A in FIGS. 2A and 2B.

Contact between bottom contact surfaces 161 of guide rails 160, 162 of toner cartridge 100 and the top surfaces of corresponding guide rails positioned at an entrance to image forming device 20 and between bottom contact surfaces 165 of guide posts 164, 166 of toner cartridge 100 and the top surfaces of corresponding guide rails that run along the length of a guide slot that receives toner cartridge 100 in image forming device 20 controls the position of toner cartridge 100 along vertical dimension 112 during insertion of toner cartridge 100 into image forming device 20 and removal of toner cartridge 100 from image forming device 20 and may aid in positioning toner cartridge 100 along vertical dimension 112 when toner cartridge 100 is in its final installed position in image forming device 20. Contact between guide rails 160, 162 and guide posts 164, 166 of toner cartridge 100 and their corresponding guide rails in image forming device 20 may also aid in controlling the position of toner cartridge 100 along side-to-side dimension 116 and limiting rotation of toner cartridge 100 during insertion of toner cartridge 100 into image forming device 20 and removal of toner cartridge 100 from image forming device 20.

Figure 3A:
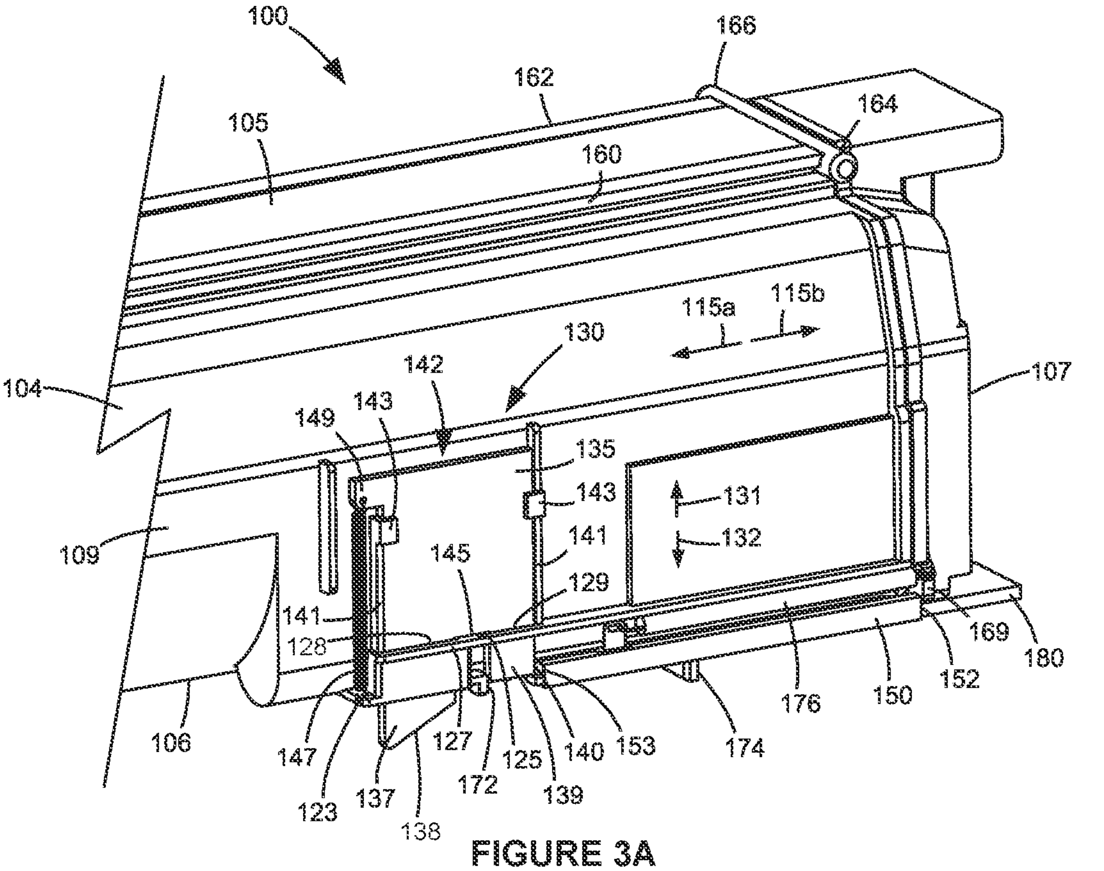
FIGS. 3A and 3B are perspective views of the toner cartridge shown in FIGS. 2A and 2B showing a shutter lock of the toner cartridge in a locked position and an unlocked position, respectively, and a shutter of the toner cartridge in a closed position and an open position, respectively, according to one example embodiment.
Figure 3B:
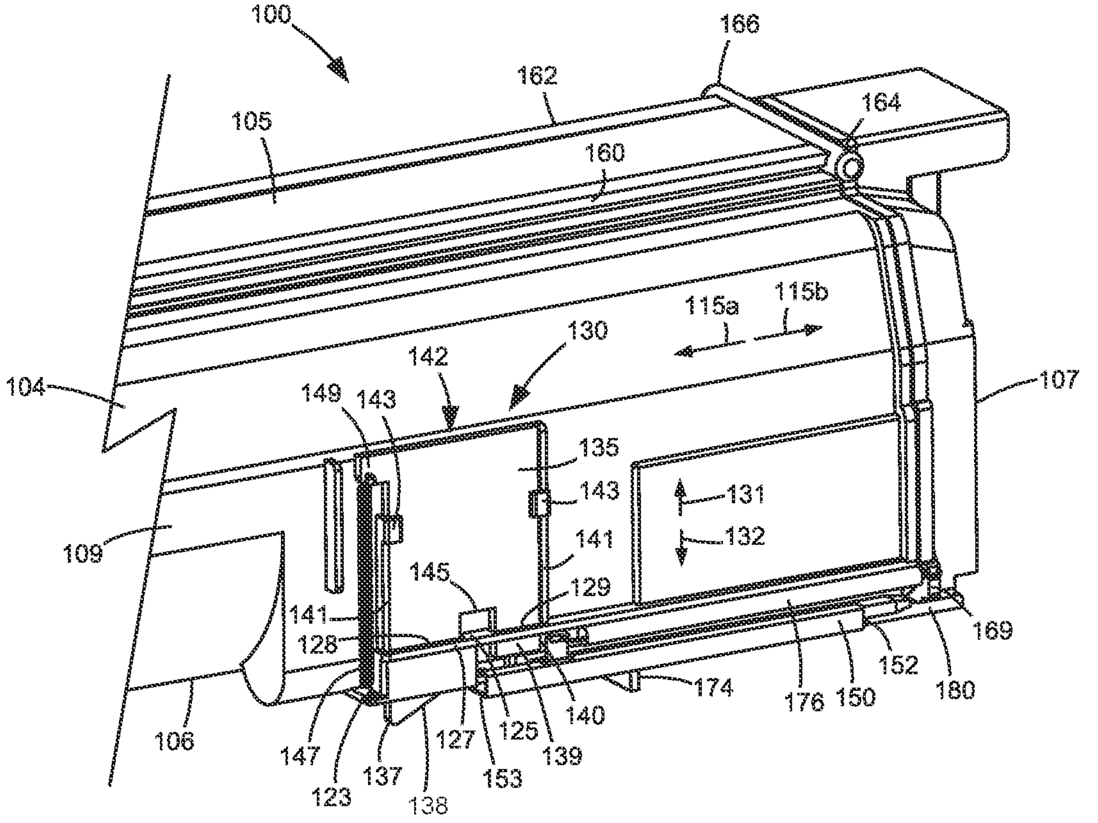

FIGS. 3A and 3B show shutter lock 130 in greater detail according to one example embodiment. In the embodiment illustrated, shutter lock 130 is positioned on side 109 of body 104 and is movable, such as translatable, between a lowered position shown in FIG. 3A and a raised position shown in FIG. 3B. In the lowered position, shutter lock 130 blocks cartridge shutter 150, shown in FIG. 3A in the closed position, from moving in front-to-rear direction 115*a* towards the open position. In the raised position, shutter lock 130 unblocks cartridge shutter 150 to allow cartridge shutter 150 to move in front-to-rear direction 115*a* towards the open position as shown in FIG. 3B. In this embodiment, shutter lock 130 moves in a bottom-to-top direction 131 relative to body 104 as shutter lock 130 moves from the lowered position to the raised position and in a top-to-bottom direction 132 relative to body 104 as shutter lock 130 moves from the raised position to the lowered position.

In the embodiment illustrated, shutter lock 130 includes a lock body 135 having an engagement arm 137 and a locking arm 139. Side 109 of body 104 includes opposed retaining ribs 141 forming a channel 142 therebetween within which lock body 135 translates on side 109 of body 104. Retaining arms 143 extend inwardly from retaining ribs 141 into channel 142 to retain lock body 135 within channel 142 to support the sliding motion of lock body 135 in directions 131, 132. Engagement arm 137 and locking arm 139 are spaced apart from each other by an intermediate edge portion 145 that is positioned to contact a portion 125 of a ledge 127 formed on side 109 of body 104. In the embodiment illustrated, ledge 127 includes slits 128, 129 for receiving engagement arm 137 and locking arm 139, respectively, in order to further support the sliding motion of lock body 135 in directions 131, 132 along side 109 of body 104. Portion 125 of ledge 127 provides a downward stop for intermediate edge portion 145 of lock body 135 to engage for limiting the downward movement of lock body 135.

Locking arm 139 of lock body 135 is movable between a locked position preventing cartridge shutter 150 from opening and an unlocked position permitting cartridge shutter 150 to open. In the embodiment illustrated, locking arm 139 is in the locked position when shutter lock 130 is in the lowered position and is in the unlocked position when shutter lock 130 is in the raised position. In the example embodiment illustrated, lock body 135 of shutter lock 130 is biased in top-to-bottom direction 132, such as by one or more springs, such that locking arm 139 is biased toward the locked position. In the embodiment illustrated, an extension spring 147 is connected between a first spring mount 149 on lock body 135 and a second spring mount 123 on side 109 of body 104 to continuously bias lock body 135 in top-to-bottom direction 132 and locking arm 139 towards the locked position. Intermediate edge portion 145 of lock body 135 contacts portion 125 of ledge 127 when locking arm 139 is in the locked position. The biasing force of spring 147 is overcome when lock body 135 moves upward in bottom-to-top direction 131 when engagement arm 137 of lock body 135 receives an upward force from a feature in image forming device 20, such as from a feature on developer unit 200, causing locking arm 139 to move from the locked position to the unlocked position. In other embodiments, lock body 135 may be pulled down and biased towards the locked position by gravity without extension spring 147.

Locking arm 139 of lock body 135 includes a blocking surface 140 that is in the path of cartridge shutter 150 when locking arm 139 is in the locked position to prevent cartridge shutter 150 from opening. In the embodiment illustrated, blocking surface 140 of locking arm 139 is positioned at a downstream location from cartridge shutter 150 relative to the front-to-rear direction 115*a* of body 104 when cartridge shutter 150 is in the closed position. In this manner, blocking surface 140 prevents cartridge shutter 150 from sliding toward rear end 108 from the closed position to the open position when locking arm 139 is in the locked position. When locking arm 139 is in the unlocked position, blocking surface 140 of locking arm 139 clears the path of cartridge shutter 150 permitting cartridge shutter 150 to slide toward rear end 108 from the closed position to the open position.

Engagement arm 137 of lock body 135 includes a camming surface 138 that is tapered upward from a bottom end of engagement arm 137 in a direction toward front end 107. Engagement arm 137 is unobstructed such that camming surface 138 contacts a feature positioned along the insertion path of engagement arm 137 in order for lock body 135 to move from the lowered position to the raised position during insertion of toner cartridge 100 into image forming device 20, as discussed below. In one embodiment, engagement arm 137 is positioned to contact a feature of developer unit 200 when toner cartridge 100 is inserted into image forming device 20 to receive an actuation force and cause lock body 135 to move upward in bottom-to-top direction 132 and, consequently, locking arm 139 to move upward from the locked position to the unlocked position with blocking surface 140 of locking arm 139 clear of the sliding path of cartridge shutter 150 in order to permit cartridge shutter 150 to move from the closed position to the open position.

It will be appreciated that lock body 135 and the mounting configuration of lock body 135 on body 104 illustrated are intended to serve as examples and that one or more components of shutter lock 130 may be mounted according to any suitable configuration that permit locking arm 139 to move between the locked and unlocked positions. For example, the locations and shapes of retaining ribs 141, retaining arms 143, slits 128 and 129, and/or locking arm 139 may vary as desired. Further, retaining ribs 141 may be provided as separate components attached to body 104. Lock body 135 may be made of plastic material. In other embodiments, lock body 135 may be made of any suitable material(s) or manufacturing technique(s) known in the art. Engagement arm 137 and locking arm 139 are formed as part of the body of lock body 135 in the example illustrated, but engagement arm 137 and/or locking arm 139 may be separate elements that are attached to the body of lock body 135. In other alternative embodiments, downward stops for limiting downward movement of lock body 135 may be positioned in other locations. For example, a downward stop engageable by spring mount 149 may be positioned beneath spring mount 149 of lock body 135.

Figure 4:
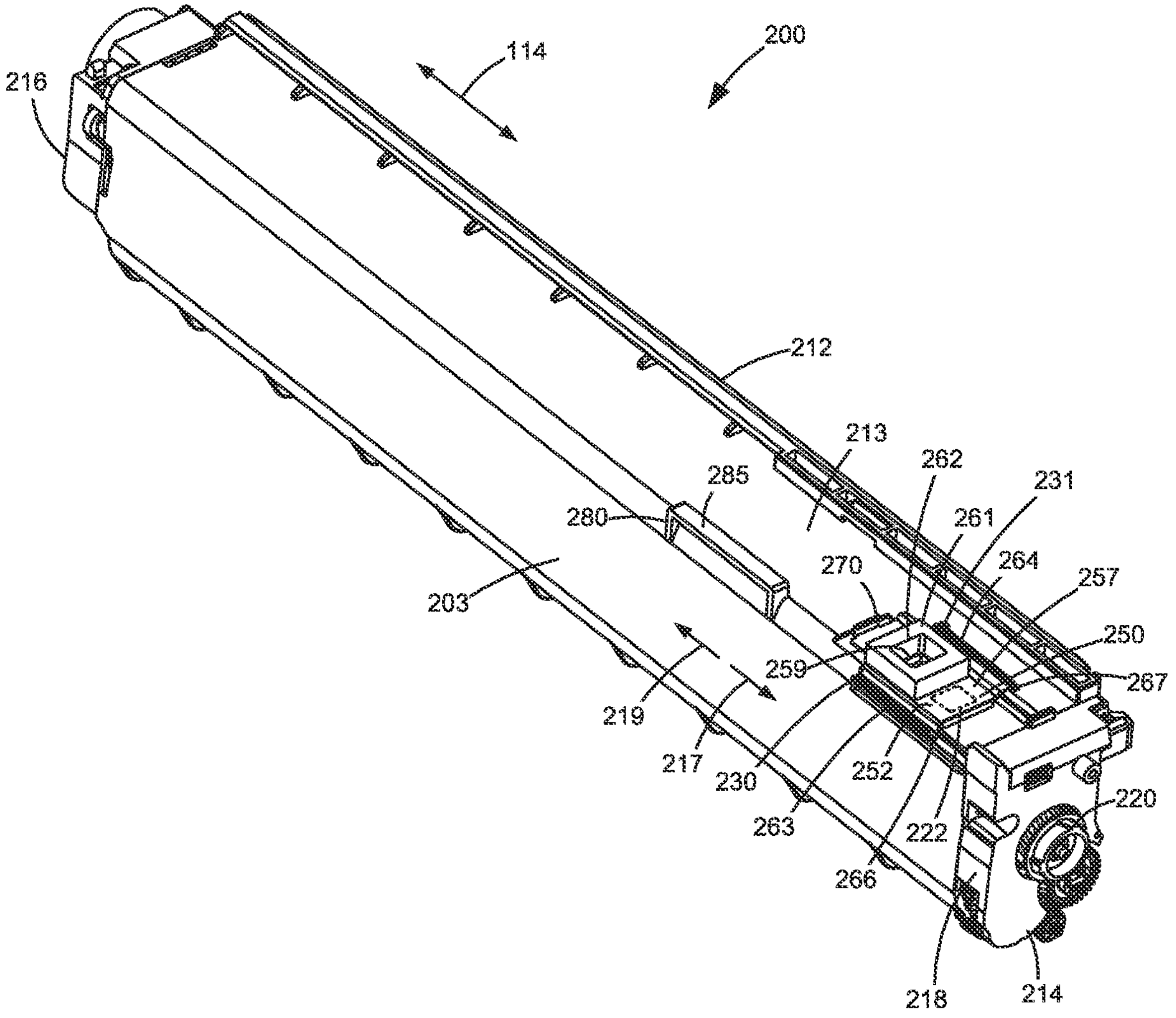
FIG. 4 is a perspective view of a developer unit according to one example embodiment.

Body 104 of toner cartridge 100 includes rearward and forward stops that prevent cartridge shutter 150 from over-traveling along front-to-rear direction 115*a* and rear-to-front direction 115*b*, respectively. In the example embodiment illustrated, a forward stop 169 is positioned on body 104 facing front end 152 of cartridge shutter 150. Contact between front end 152 of cartridge shutter 150 and forward stop 169 limits forward travel of cartridge shutter 150 toward front end 107. A rearward stop 172 is positioned on body 104 facing a rear end 153 of cartridge shutter 150. In one embodiment, locking arm 139 is positioned closer to rear end 153 of cartridge shutter 150 than rearward stop 172 is to rear end 153 of cartridge shutter 150 when locking arm 139 is in the locked position. In the embodiment illustrated, rearward stop 172 is positioned in the space between engagement arm 137 and locking arm 139 of shutter lock 130 when locking arm 139 is in the locked position. Contact between rear end 153 of cartridge shutter 150 and rearward stop 172 limits rearward travel of cartridge shutter 150 toward rear end 108. lock body FIG. 4 shows developer unit 200 according to one example embodiment. Developer unit 200 includes a housing 212 having reservoir 202 therein. Housing 212 extends generally along longitudinal dimension 114 from a front end 214 to a rear end 216 of housing 212. In the embodiment illustrated, front end 214 of housing 212 includes an end cap 218 mounted by fasteners, such as screws, to a main body of housing 212.

Developer unit 200 includes a drive coupler 220 that mates with and receives rotational power from a corresponding drive coupler in image forming device 20 when developer unit 200 is installed in image forming device 20 in order to provide rotational power to various rotatable components of developer unit 200, such as toner adder roll 204, developer roll 206 and one or more toner agitators positioned within reservoir 202. In the example embodiment illustrated, drive coupler 220 is positioned on front end 214 of housing 212.

Developer unit 200 includes an inlet port 222 positioned to receive toner from outlet port 122 of toner cartridge 100 to replenish reservoir 202 as toner is consumed from reservoir 202 by the printing process. In the example embodiment illustrated, inlet port 222 is positioned on a top 213 of housing 212 near front end 214. Developer unit 200 includes a shutter 250 that is translatable along longitudinal dimension 114 between a closed position blocking inlet port 222 to prevent toner from escaping inlet port 222 and an open position unblocking inlet port 222 to permit toner to enter inlet port 222. Shutter 250 may be referred to herein as developer shutter 250. In the embodiment illustrated, developer shutter 250 moves in a rear-to-front direction 217 relative to housing 212 as developer shutter 250 moves from the closed position to the open position and in a front-to-rear direction 219 relative to housing 212 as developer shutter 250 moves from the open position to the closed position. In this embodiment, developer shutter 250 includes a blocking portion 257 and a window 259. Blocking portion 257 blocks inlet port 222 when developer shutter 250 is in the closed position as shown in FIG. 4. When developer shutter 250 is in the open position, such as after moving in the rear-to-front direction 217 from the closed position, window 259 aligns with inlet port 222 to allow toner to enter inlet port 222.

Developer shutter 250 is biased toward the closed position blocking inlet port 222 such as, for example, by one or more extension springs 263, 264. Each extension spring 263, 264 has one end attached to a corresponding spring mount 266, 267 on developer shutter 250 and another end attached to a corresponding spring mount 230, 231 on housing 212. While the example embodiment illustrated includes extension springs 263, 264, it will be appreciated that developer shutter 250 may be biased relative to housing 212 by any suitable biasing member as desired, including, for example, one or more compression springs, torsion springs, leaf springs, or other materials having resilient properties.

In the embodiment illustrated, developer shutter 250 includes a seal 261 surrounding window 259. Seal 261 is fixed to developer shutter 250 and moves with developer shutter 250. In the embodiment illustrated, seal 261 includes an opening 262 that is aligned and fixed relative to window 259. Seal 261 is positioned on a top surface of developer shutter 250 near inlet port 222 to capture any toner leaked between outlet port 122 of toner cartridge 100 and inlet port 222 and to provide a sealing force between cartridge shutter 150 and developer shutter 250 when toner cartridge 100 is inserted into image forming device 20. Although not shown, a seal may be positioned on a bottom surface of developer shutter 250 between base 252 of developer shutter 250 and top 213 of housing 212 of developer unit 200 to help block toner from leaking from inlet port 222.

Developer shutter 250 includes an actuation tab 270 extending upward from developer shutter 250. Actuation tab 270 is positioned along the insertion path of projection 174 of cartridge shutter 150 to receive an actuation force from toner cartridge 100 against the biasing force of extension springs 263, 264 to move developer shutter 250 from the closed position to the open position during insertion of toner cartridge 100 into image forming device 20, as discussed below.

In the embodiment illustrated, developer unit 200 includes a cam rib 280 extending upward from a top 213 of housing 212 and along a side 203 of housing 212. In the embodiment illustrated, cam rib 280 is positioned at a downstream location from developer shutter 250 relative to the front-to-rear direction 219 of housing 212. Cam rib 280 is positioned along the path of insertion of engagement arm 137 of shutter lock 130 to provide an actuation force to engagement arm 137 of shutter lock 130 to move shutter lock 130 from the lowered position to the raised position against the biasing force of spring 147 to thereby move locking arm 139 from the locked position to the unlocked position during insertion of toner cartridge 100 into image forming device 20. Cam rib 280 includes a cam surface 285. When engagement arm 137 of shutter lock 130 engages cam rib 280 of developer unit 200 during insertion of toner cartridge 100 into image forming device 20, engagement arm 137 contacts and slides along cam surface 285 of cam rib 280 as toner cartridge 100 is further inserted into image forming device 20. To reduce frictional resistance between contact points, engagement arm 137 and cam surface 285 may be made from materials having relatively small coefficients of friction.

FIGS. 5A-5E illustrate the operation of shutter lock 130 during insertion of toner cartridge 100 into image forming device 20 with developer unit 200 in its final installed position in image forming device 20 according to one example embodiment. The direction of insertion of toner cartridge 100 into image forming device 20 is indicated by arrow A in FIGS. 5A-5E. As discussed above, toner cartridge 100 is inserted into image forming device 20 generally along longitudinal dimension 114 of toner cartridge 100 with front end 107 of body 104 leading and rear end 108 of body 104 trailing. In the embodiment shown, guide post 164 of toner cartridge 100 travels along a corresponding guide rail 90 in image forming device 20 to assist with the insertion of toner cartridge 100 into image forming device 20. In the example embodiment illustrated, guide post 166 of toner cartridge 100 also travels along a corresponding guide rail (not shown) in image forming device 20 to assist with the insertion of toner cartridge 100 into image forming device 20.

Figure 5A:
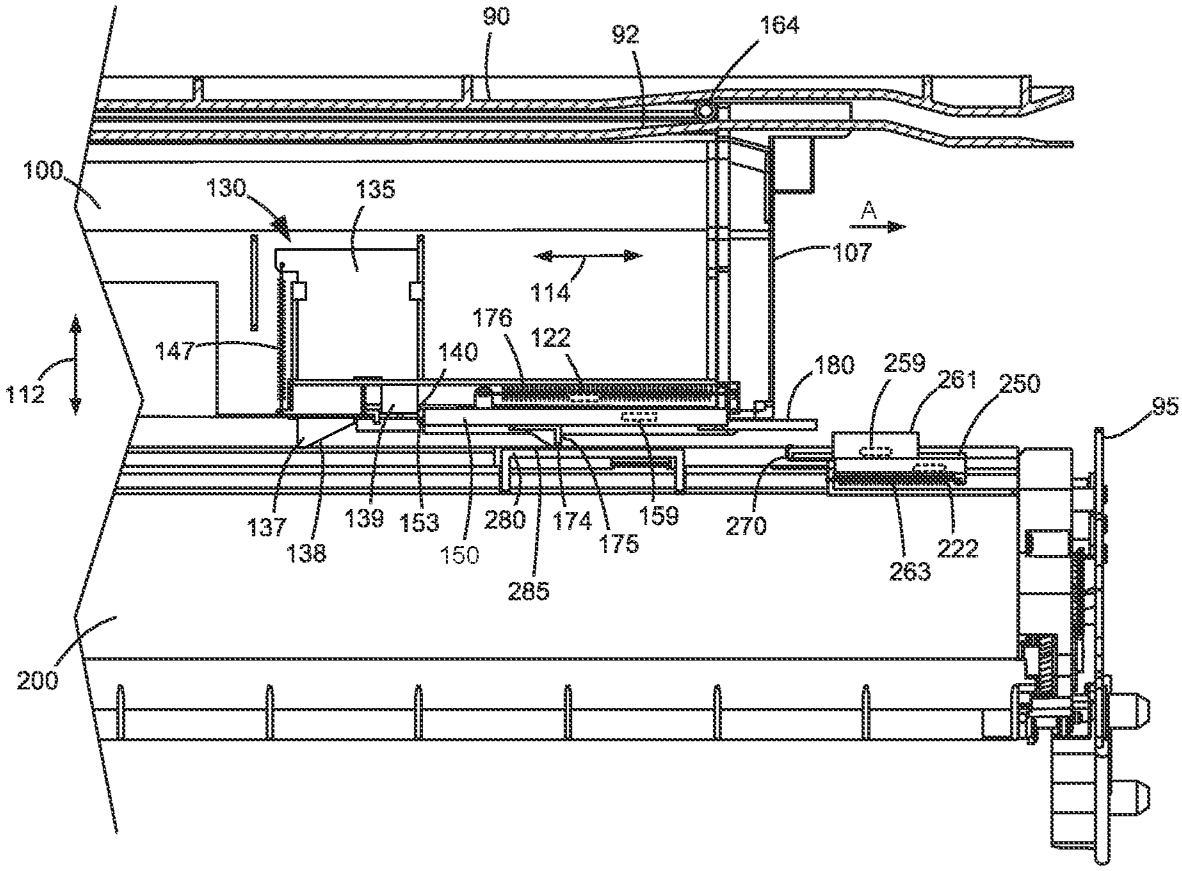
FIGS. 5A-5E are sequential side views showing the operation of the shutter lock shown in FIGS. 3A and 3B during insertion of the toner cartridge into the image forming device according to one example embodiment.

FIG. 5A shows toner cartridge 100 during insertion into image forming device 20 with shutter lock 130 of toner cartridge 200 approaching cam rib 280 of developer unit 200 as toner cartridge 100 moves in direction of insertion A. Shutter lock 130 of toner cartridge 100 is in the lowered position with locking arm 139 in the locked position as a result of the bias applied by spring 147. Blocking surface 140 of locking arm 139 is positioned in the sliding path of cartridge shutter 150. Cartridge shutter 150 and developer shutter 250 are in their respective closed positions as a result of the bias applied by springs 176, 263, respectively. In the embodiment illustrated, guide post 164 moves up a raised section 92 of guide rail 90 causing front end 107 of toner cartridge 100 to move upward relative to developer unit 200 allowing extension 180 of cartridge shutter 150 to lift away from developer shutter 250.

Figure 5B:
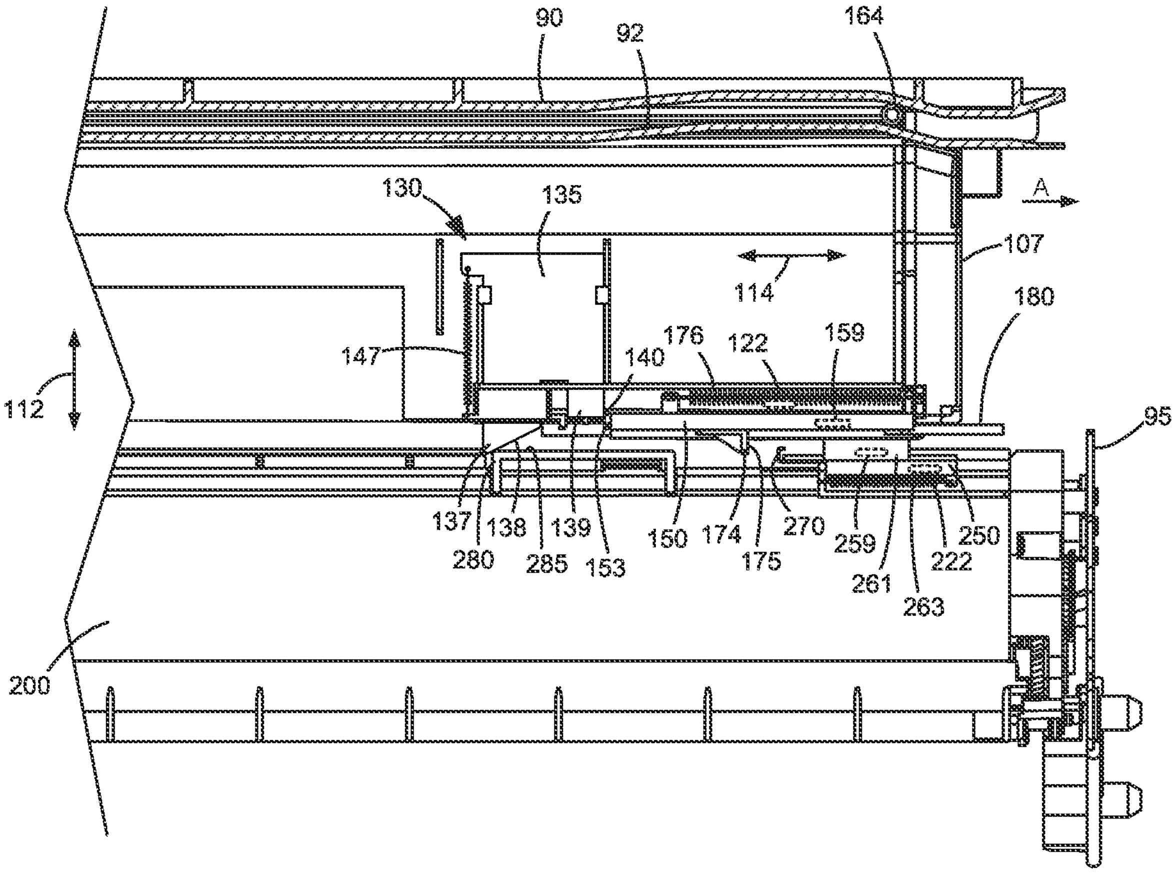

FIG. 5B shows toner cartridge 100 advanced forward in the direction of insertion A of toner cartridge 100 from the position shown in FIG. 5A. In the embodiment illustrated, camming surface 138 of engagement arm 137 of shutter lock 130 initially contacts cam rib 280 of developer unit 200. Shutter lock 130 of toner cartridge 100 is in the lowered position and locking arm 139 is in the locked position with blocking surface 140 positioned in the sliding path of cartridge shutter 150. As guide post 164 travels along raised section 92 of guide rail 90, extension 180 of cartridge shutter 150 moves forward in direction of insertion A above developer shutter 250, clear of seal 261 in order to avoid damaging seal 261, which could cause toner leakage or failure of toner to flow through opening 262 of seal 261.

Figure 5C:
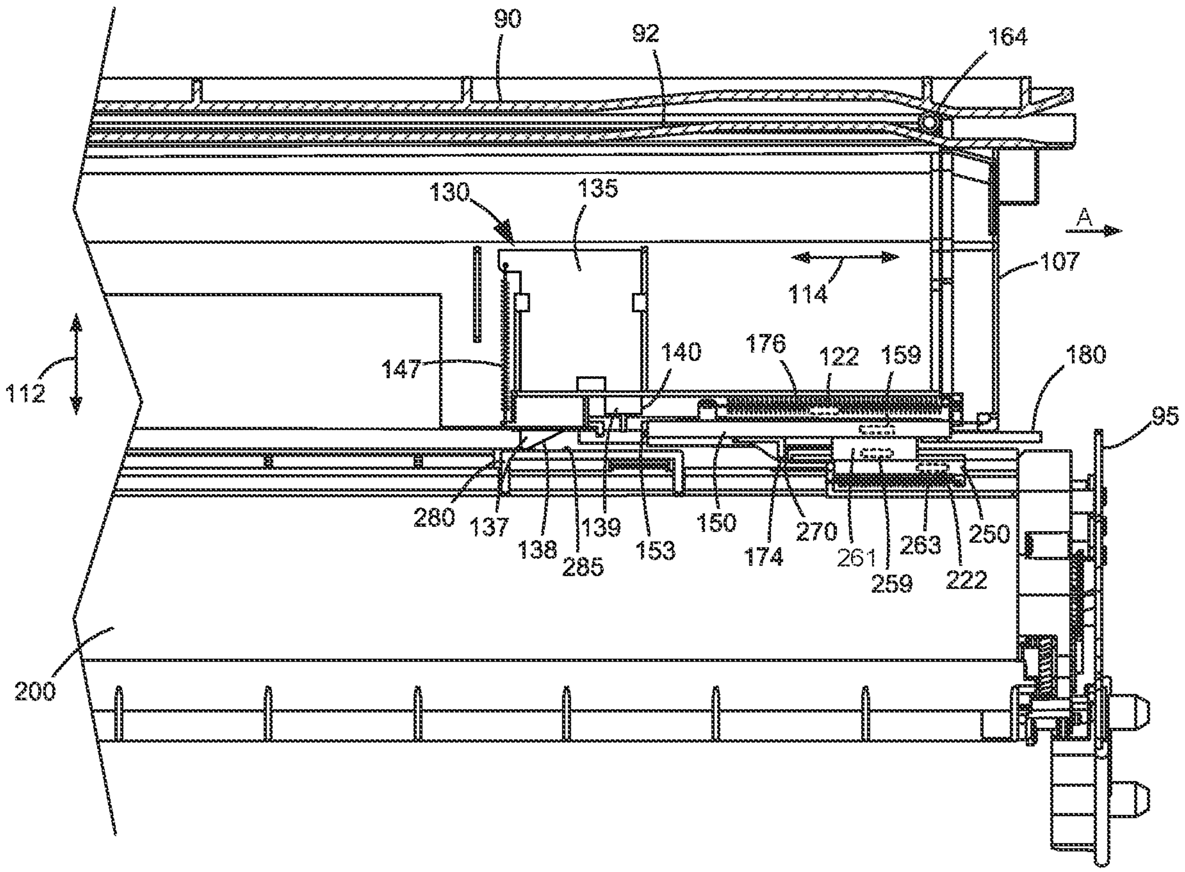

As toner cartridge 100 advances further forward in the direction of insertion A of toner cartridge 100 from the position shown in FIG. 5B, engagement arm 137 of shutter lock 130 travels along cam surface 285 of cam rib 280 and extension 180 of cartridge shutter 150 moves past seal 261 of developer shutter 250 as shown in FIG. 5C. As guide post 164 moves down raised section 92 of guide rail 90, front end 107 of toner cartridge 100 moves downward allowing cam rib 280 of developer unit 200 to push engagement arm 137 of shutter lock 130 upward against the biasing force of spring 147 causing locking arm 139 of shutter lock 130 to move from the locked position to the unlocked position with blocking surface 140 clear of the sliding path of cartridge shutter 150. Also, as guide post 164 moves down raised section 92 of guide rail 90 and front end 107 of toner cartridge 100 moves downward, cartridge shutter 150 contacts seal 261 of developer shutter 250.

Further, in the embodiment illustrated, front face 175 of projection 174 of cartridge shutter 150 contacts actuation tab 270 of developer shutter 250 as locking arm 139 moves toward the unlocked position. In the position shown, window 159 of cartridge shutter 150 aligns with window 259 of developer shutter 250 along vertical dimension 112 while cartridge shutter 150 and developer shutter 250 remain in their respective closed positions. In this embodiment, seal 261 of developer shutter 250 contacts cartridge shutter 150 in the area surrounding window 159 of cartridge shutter 150 prior to developer shutter 250 moving from the closed position toward the open position in order to seal the interface between cartridge shutter 150 and developer shutter 250 prior to opening shutters 150, 250 in order to help contain the toner transferring from outlet port 122 of toner cartridge 100 to inlet port 222 of developer unit 200 and reduce toner leakage.

Figure 5D:
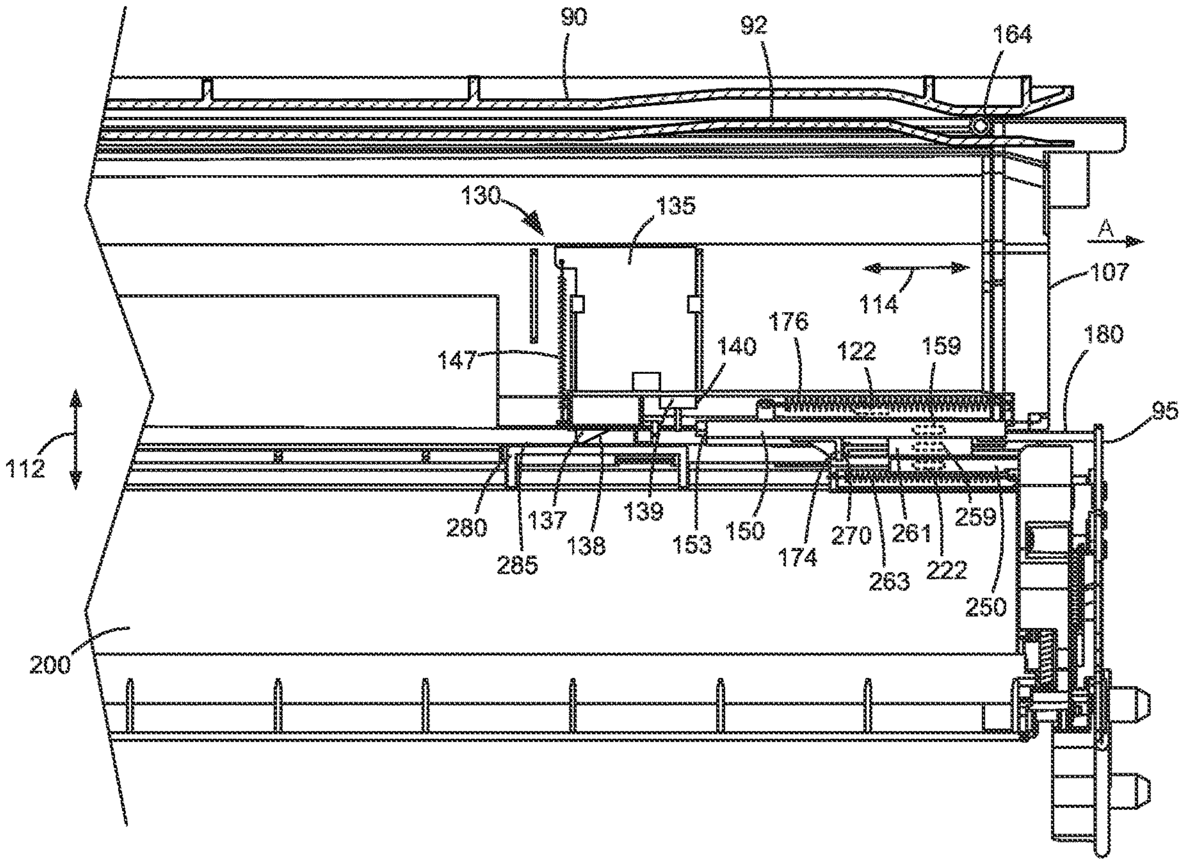

FIG. 5D shows toner cartridge 100 advanced forward in the direction of insertion A from the position shown in FIG. 5C just prior to toner cartridge 100 reaching its final installed position in image forming device 20. In the embodiment illustrated, locking arm 139 of shutter lock 130 remains in the unlocked position with blocking surface 140 clear of the sliding path of cartridge shutter 150 as engagement arm 137 slides along cam surface 285 of cam rib 280. While locking arm 139 of shutter lock 130 is held in the unlocked position, cartridge shutter 150 pushes open developer shutter 250. Specifically, as toner cartridge 100 advances from the position shown in FIG. 5C with front face 175 of projection 174 of cartridge shutter 150 in contact with actuation tab 270 of developer shutter 250, the force applied to developer shutter 250 by projection 174 of cartridge shutter 150 overcomes the bias applied to developer shutter 250 by spring 263 allowing projection 174 of cartridge shutter 150 to push developer shutter 250 toward its open position. With locking arm 139 of shutter lock 130 in the unlocked position clear of the sliding path of cartridge shutter 150 while cartridge shutter 150 pushes open developer shutter 250, contact between locking arm 139 and cartridge shutter 150 may be avoided in case cartridge shutter 150 moves slightly in front-to-rear direction **115*a* relative to toner cartridge 100 against the biasing force of extension springs 176, 177 of cartridge shutter 150 while cartridge shutter 150 moves developer shutter 250 in rear-to-front direction 217 (direction of insertion A) against the biasing force of extension springs 263, 264 of developer shutter 250. By having locking arm 139 of shutter lock 130 raised in the unlocked position while cartridge shutter 150 pushes open developer shutter 250, no force from shutter lock 130 may influence the operation between cartridge shutter 150 and developer shutter 250. Accordingly, in this embodiment, shutter lock 130 may operate independently from the opening and closing operations of cartridge shutter 150 and developer shutter 250. When projection 174 of cartridge shutter 150 has pushed developer shutter 250 to its open position, window 159 of cartridge shutter 150 and window 259 of developer shutter 250 align with inlet port 222 of developer unit 200. Further, in the embodiment illustrated, extension 180 of cartridge shutter 150 begins to contact an engagement surface 95 in image forming device 20 as developer shutter 250** reaches the open position.

In one embodiment, the respective biasing forces urging cartridge shutter 150 and developer shutter 250 towards their closed positions are selected such that the biasing force on cartridge shutter 150 prevents the reaction force applied to projection 174 of cartridge shutter 150 by actuation tab 270 from moving cartridge shutter 150 to a position unblocking outlet port 122 of toner cartridge 100 as projection 174 of cartridge shutter 150 pushes open developer shutter 250 during insertion of toner cartridge 100 into image forming device 20. In one embodiment, extension springs 176, 177 acting on cartridge shutter 150 may have a combined spring force that holds cartridge shutter 150 in its closed position and/or prevents cartridge shutter 150 from unblocking outlet port 122 while cartridge shutter 150 pushes open developer shutter 250. For example, the combined spring force of extension springs 176, 177 that biases cartridge shutter 150 towards its closed position may be greater than the combined spring force of extension springs 263, 264 that biases developer shutter 250 towards its closed position to allow cartridge shutter 150 to move developer shutter 250 in rear-to-front direction 217 (direction of insertion A) against the biasing force of extension springs 263, 264 of developer shutter 250 to unblock inlet port 222 of developer unit 200 without causing cartridge shutter 150 to move in front-to-rear direction 115*a* relative to toner cartridge 100 against the biasing force of extension springs 176, 177 of cartridge shutter 150 to unblock outlet port 122 of toner cartridge 100.

Figure 5E:
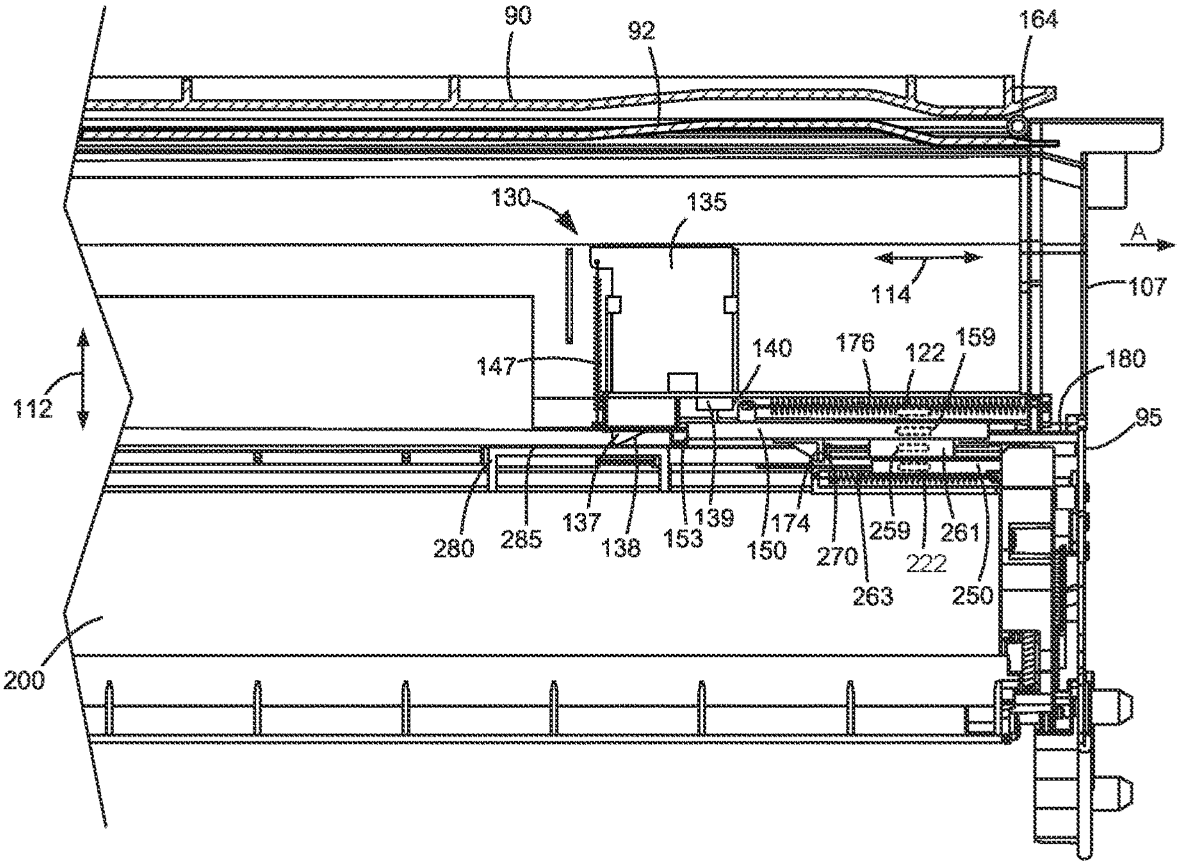

FIG. 5E shows toner cartridge 100 in its final installed position in image forming device 20, advanced forward in the direction of insertion A of toner cartridge 100 from the position shown in FIG. 5D. In the embodiment illustrated, developer shutter 250 is held by cartridge shutter 150 in the open position while cartridge shutter 150 moves from the closed position to the open position with locking arm 139 of shutter lock 130 held in the unlocked position as engagement arm 137 travels along cam surface 285 of cam rib 280. Specifically, as toner cartridge 100 advances in direction of insertion A with extension 180 of cartridge shutter 150 in contact with engagement surface 95 in image forming device 20, the force applied to extension 180 of cartridge shutter 150 by engagement surface 95 overcomes the bias applied to cartridge shutter 150 by springs 176, 177 allowing engagement surface 95 to hold cartridge shutter 150 in place (i.e., stationary relative to developer unit 200) against the biasing force of springs 176, 177 as toner cartridge 100 moves towards its final installed position. In this manner, developer shutter 250 is held in its open position by cartridge shutter 150 while cartridge shutter 150, although stationary relative to image forming device 20, moves in front-to-rear direction 115*a* relative to body 104 of toner cartridge 100 toward its open position sliding below locking arm 139 of shutter lock 130 as toner cartridge 100 moves in direction of insertion A towards its final position in image forming device 20. In the embodiment illustrated, engagement surface 95 forms part of a basket or tray that holds developer unit 200 in image forming device 20. In other embodiments, any internal feature or datum in image forming device 20 may contact extension 180 of cartridge shutter 150 to hold cartridge shutter 150 in place while toner cartridge 100 moves toward its final installed position in image forming device 20. In other embodiments, developer shutter 250 contacts a stop upon reaching the open position of developer shutter 250 and contact between front face 175 of projection 174 of cartridge shutter 150 and actuation tab 270 of developer shutter 250 holds cartridge shutter 150 in place while toner cartridge 100 moves toward its final installed position in image forming device 20.

In the example embodiment illustrated, when toner cartridge 100 is fully inserted into image forming device 20, in its final installed position in image forming device 20, contact between engagement arm 137 of shutter lock 130 and cam rib 280 of developer unit 200 holds locking arm 139 of shutter lock 130 in the unlocked position with locking arm 139 spaced above rear end 153 of cartridge shutter 150. In addition, contact between engagement surface 95 in image forming device 20 and extension 180 of cartridge shutter 150 of toner cartridge 100 holds cartridge shutter 150 in the open position which, in turn, holds developer shutter 250 in the open position as a result of contact between front face 175 of projection 174 of cartridge shutter 150 and actuation tab 270 of developer shutter 250. In this embodiment, when toner cartridge 100 is in its final installed position in image forming device 20, a latch in image forming device 20 restrains toner cartridge 100 in a direction from front end 107 of body 104 toward rear end 108 of body 104 along longitudinal dimension 114, overcoming the spring force from springs 176, 177 on toner cartridge 100 and the reaction force applied to projection 174 of cartridge shutter 150 by actuation tab 270 of developer shutter 250 and preventing these forces from pushing toner cartridge 100 out of image forming device 20. When cartridge shutter 150 and developer shutter 250 are in their respective open positions, outlet port 122 and window 159 of cartridge shutter 150 of toner cartridge 100 are aligned with inlet port 222 and window 259 of developer shutter 250 of developer unit 200.

When toner cartridge 100 is removed from image forming device 20, the above sequence is reversed. The biasing force applied by springs 176, 177 returns cartridge shutter 150 of toner cartridge 100 to the closed position as toner cartridge 100 moves from the position shown in FIG. 5E to the position shown in FIG. 5D, and the biasing force applied by springs 263, 264 returns developer shutter 250 to the closed position as toner cartridge 100 moves from the position shown in FIG. 5D to the position shown in FIG. 5C. Locking arm 139 remains in the unlocked position until guide post 164 moves up raised section 92 of guide rail 90 lifting front end 107 of toner cartridge 100 and allowing the biasing force applied by spring 147 to move shutter lock 130 toward the lowered position and locking arm 139 toward the locked position thereby returning blocking surface 140 to the sliding path of cartridge shutter 150 as shown in FIG. 5B. When engagement arm 137 of shutter lock 130 disengages from cam rib 280 of developer unit 200 as toner cartridge 100 is further removed from image forming device 20, spring 147 fully returns shutter lock 130 to the lowered position and locking arm 139 to the locked position as shown in FIG. 5A.

The above example embodiments show cam rib 280 of developer unit 200 contacting engagement arm 137 of lock body 135 near the bottom end of camming surface 138. In other embodiments, cam rib 280 may contact any portion of camming surface 138 of engagement arm 138 as engagement arm 137 initially contacts cam rib 280 during insertion of toner cartridge 100 into image forming device 20. Engagement arm 137 may then slide upward as camming surface 138 slides along cam rib 280 as toner cartridge 100 is further inserted into image forming device 20 until contact between camming surface 138 of engagement arm 137 and cam rib 280 reaches the bottom end of camming surface 138, after which camming surface 138 may then slide along cam surface 285 of cam rib 280.

The above example embodiments show locking arm 139 spaced above rear end 153 of cartridge shutter 150 when toner cartridge 100 is in its final installed position in image forming device 20. In other embodiments, locking arm 139 may be configured to move towards cartridge shutter 150 as cartridge shutter 150 approaches the open position. For example, in the embodiment illustrated in FIG. 6, cam surface 285 of cam rib 280 of developer unit 200 may include an angled ramp 287 such that engagement arm 137 of shutter lock 130 may slide down angled ramp 287 as engagement arm 137 remains in contact with cam surface 285 of cam rib 280 as result of the biasing force of spring 147 when toner cartridge 100 moves toward its final installed position in image forming device 20 with cartridge shutter 150 moving towards the open position. In this manner, any residual reaction force that may act to push toner cartridge 100 upward or developer unit 200 downward due to contact between toner cartridge 100 and developer unit 200 via shutter lock 130 may be reduced or eliminated. In one example embodiment, ramp 287 may be shaped to taper downward such that locking arm 139 rests on top of cartridge shutter 150 when cartridge shutter 150 is in the open position and toner cartridge 100 is in its final installed position. This eliminates any continual reaction force or other extraneous forces on toner cartridge 100 and developer unit 200 from the biasing force of spring 147 allowing toner cartridge 100 and developer unit 200 to be kept more accurately located against their corresponding positional datums in image forming device 20.

Figure 6:
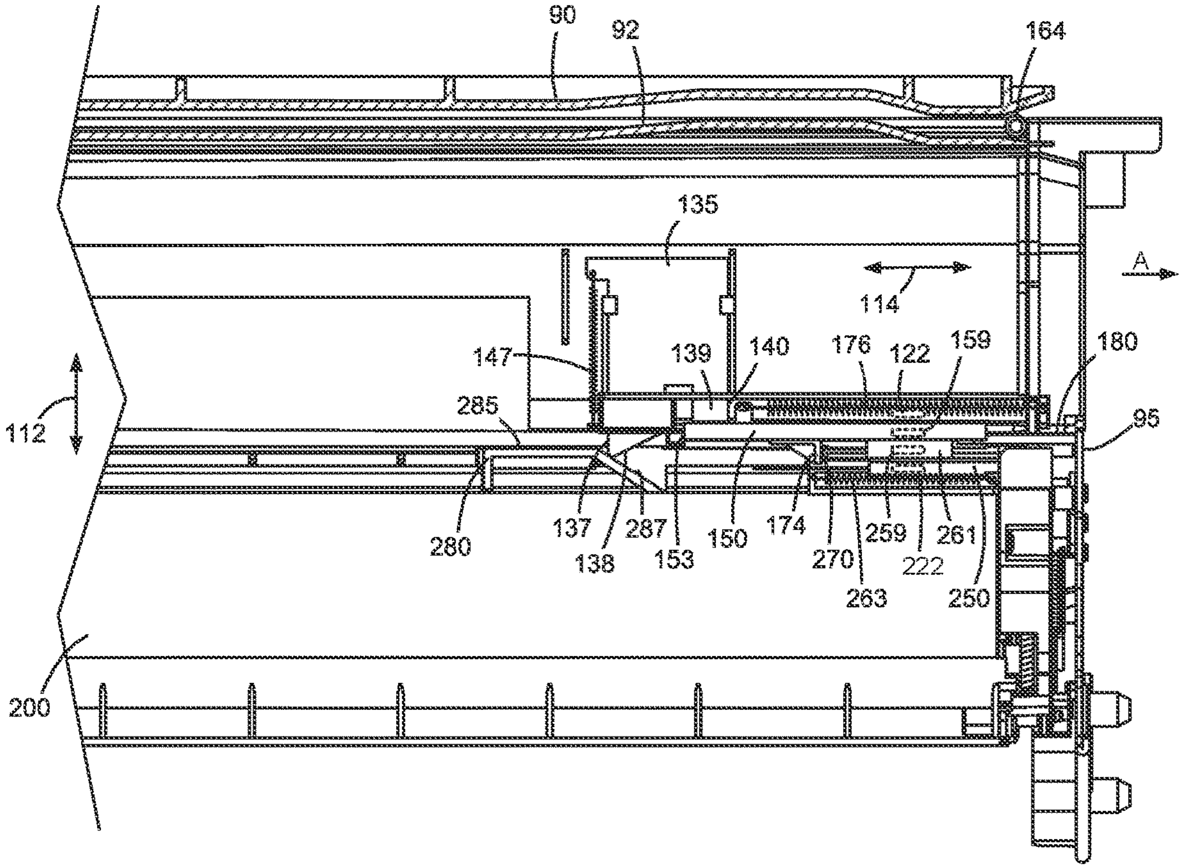
FIG. 6 is a side view showing the shutter lock in an unlocked position according to another example embodiment.
Figure 7:
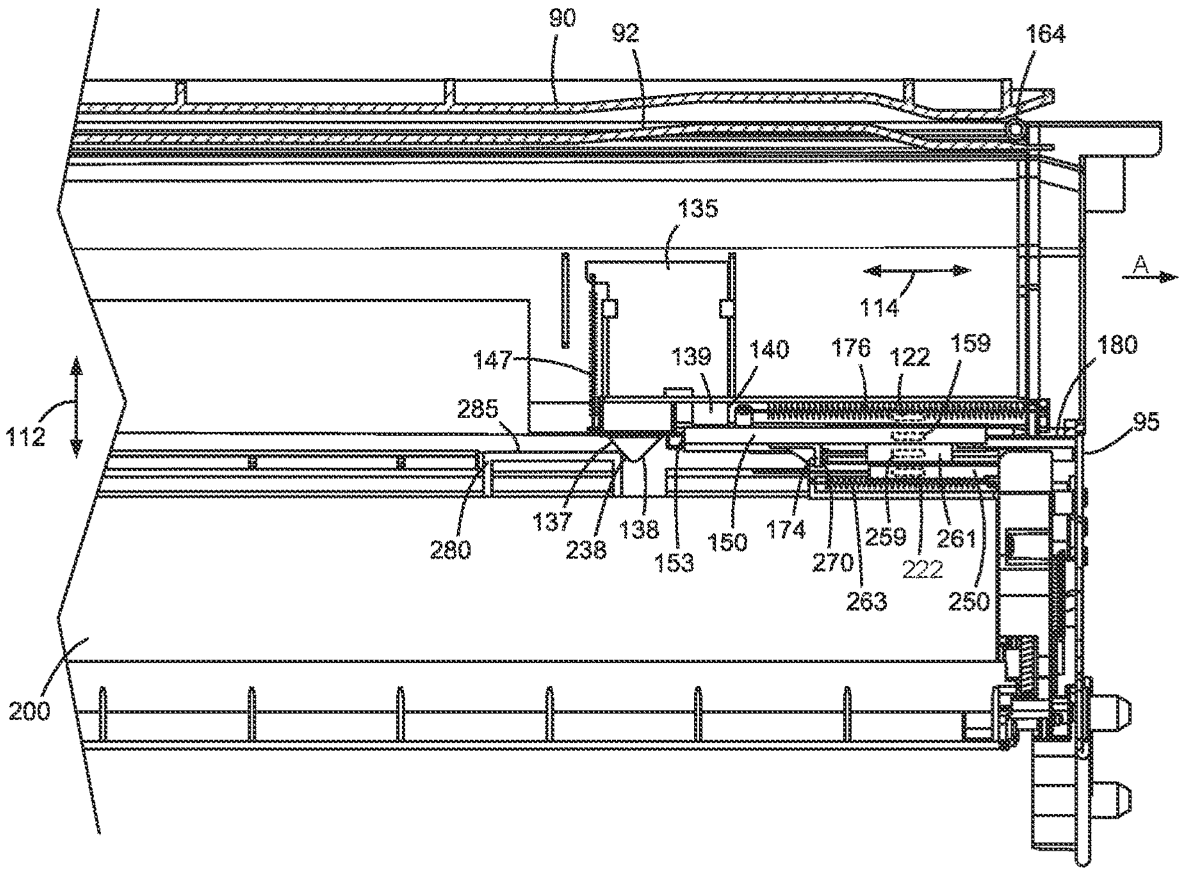
FIG. 7 is a side view showing a shutter lock in an unlocked position according to another example embodiment.

In the embodiment illustrated in FIG. 6, ramp 287 of cam rib 280 allows locking arm 139 of shutter lock 130 to move towards cartridge shutter 150 when cartridge shutter moves towards the open position as toner cartridge 100 moves toward its final installed position. In other alternative embodiments, features that allow locking arm 139 to move downward towards cartridge shutter 150 as toner cartridge 100 approaches its final installed position and to move upward away from cartridge shutter 150 when toner cartridge 100 is removed may be provided on engagement arm 137 of shutter lock 130. For example, in the embodiment illustrated in FIG. 7, the profile of engagement arm 137 may have a tapered lead-in surface 238 opposite camming surface 138 that contacts cam rib 280 to facilitate upward movement of engagement arm 137 and, consequently, upward movement of locking arm 139 as cartridge shutter 150 moves from the open position to the closed position as toner cartridge 100 is removed from image forming device 20.

In the above example embodiments, shutter lock 130 operates independently in a way which does not interfere with the opening and closing operation of cartridge shutter 150. In other alternative example embodiments, shutter lock 130 may be used to control timing and sequencing of the opening and/or closing operation of cartridge shutter 150 as desired. For example, a spring force may be applied to cartridge shutter 150 such that cartridge shutter 150 is held against blocking surface 140 of locking arm 139 before engagement arm 137 of shutter lock 130 contacts cam rib 280 of developer unit 200 during insertion of toner cartridge 100 into image forming device. When engagement arm 137 of shutter lock 130 contacts cam rib 280 and moves toward the raised position as engagement arm 137 slides along cam surface 285, locking arm 139 is released from contact with cartridge shutter 150 thereby permitting cartridge shutter 150 to move from the closed position to the open position.

Further, although the example image forming device 20 discussed above includes four toner cartridges 100 and corresponding developer units 200 and PC units 300, more or fewer replaceable units may be used depending on the color options needed. For example, in one embodiment, the image forming device includes a single toner cartridge and corresponding developer unit and PC unit in order to permit monochrome printing.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. A toner container for use in an image forming device, comprising:

a body having a reservoir for holding toner;

a toner port on the body in fluid communication with the reservoir;

a shutter translatable along a first dimension between a closed position blocking the toner port and an open position unblocking the toner port; and a lock translatable along a second dimension orthogonal to the first dimension between a locked position blocking the shutter from moving from the closed position to the open position and an unlocked position unblocking the shutter permitting the shutter to move from the closed position to the open position.

2. The toner container of claim 1, wherein the first dimension is a horizontal dimension, and the second dimension is a vertical dimension.

3. The toner container of claim 2, wherein the lock moves upward when the lock moves from the locked position to the unlocked position, and the lock moves downward when the lock moves from the unlocked position to the locked position.

4. The toner container of claim 1, wherein the lock includes a locking arm having a blocking surface, the locking arm is movable between the locked position where the blocking surface is positioned in a path of the shutter blocking the shutter from moving from the closed position to the open position and the unlocked position where the blocking surface is positioned clear from the path of the shutter permitting the shutter to move from the closed position to the open position.

5. The toner container of claim 4, wherein the locking arm is spaced from the shutter when the lock is in the unlocked position and the shutter is in the open position.

6. The toner container of claim 4, wherein the locking arm contacts the shutter when the lock is in the unlocked position and the shutter is in the open position.

7. The toner container of claim 4, wherein the lock includes a camming surface positioned to receive a force from a corresponding surface in the image forming device that causes the lock to move from the locked position to the unlocked position during installation of the toner container into the image forming device.

8. A toner container for use in an image forming device, comprising:

a body having a reservoir for holding toner;

a toner port on the body in fluid communication with the reservoir;

a shutter translatable along a horizontal dimension between a closed position blocking the toner port and an open position unblocking the toner port; and a lock movable upward and downward between a locked position blocking the shutter from moving from the closed position to the open position and an unlocked position permitting the shutter to move from the closed position to the open position.

9. The toner container of claim 8, wherein the lock is translatable upward and downward between the locked position and the unlocked position.

10. The toner container of claim 9, wherein the lock moves upward when the lock moves from the locked position to the unlocked position, and the lock moves downward when the lock moves from the unlocked position to the locked position.

11. The toner container of claim 9, wherein the lock is translatable along a vertical dimension orthogonal to the horizontal dimension.

12. The toner container of claim 8, wherein the lock includes a locking arm having a blocking surface, the locking arm is movable between the locked position where the blocking surface is positioned in a path of the shutter blocking the shutter from moving from the closed position to the open position and the unlocked position where the blocking surface is positioned clear from the path of the shutter permitting the shutter to move from the closed position to the open position.

13. The toner container of claim 12, wherein the locking arm is spaced from the shutter when the lock is in the unlocked position and the shutter is in the open position.

14. The toner container of claim 12, wherein the locking arm contacts the shutter when the lock is in the unlocked position and the shutter is in the open position.

15. The toner container of claim 12, wherein the lock includes a camming surface for contacting a corresponding surface in the image forming device during insertion of the toner container into the image forming device and receiving an actuation force from the corresponding surface in the image forming device to move the lock from the locked position to the unlocked position.

16. A toner container for use in an image forming device, comprising:

a body having a top, a bottom, a first side and a second side positioned between a first longitudinal end and a second longitudinal end of the body, a longitudinal dimension of the toner container that is orthogonal to a vertical dimension of the toner container extends between the first longitudinal end of the body and the second longitudinal end of the body, the first longitudinal end of the body leads during insertion of the toner container into the image forming device and the second longitudinal end of the body trails during insertion of the toner container into the image forming device, the body has a reservoir for holding toner;

an outlet port on the bottom of the body for exiting toner from the reservoir;

a shutter movable along the longitudinal dimension of the body between a closed position blocking the outlet port and an open position unblocking the outlet port, the shutter moves in a direction away from the first longitudinal end of the body and toward the second longitudinal end of the body when the shutter moves from the closed position to the open position and the shutter moves in a direction away from the second longitudinal end of the body and toward the first longitudinal end of the body when the shutter moves from the open position to the closed position; and a lock positioned on the first side of the body and movable along the vertical dimension of the body between a locked position blocking the shutter from moving from the closed position to the open position and an unlocked position permitting the shutter to move from the closed position to the open position.

17. The toner container of claim 16, wherein the lock is translatable along the vertical dimension of the body between the locked position and the unlocked position.

18. The toner container of claim 17, wherein the shutter is translatable along the longitudinal dimension of the body between the closed position and the open position.

19. The toner container of claim 16, wherein the lock moves upward when the lock moves from the locked position to the unlocked position, and the lock moves downward when the lock moves from the unlocked position to the locked position.

20. The toner container of claim 16, wherein the lock includes a locking arm having a blocking surface, the locking arm is movable between the locked position where the blocking surface is positioned in a path of the shutter blocking the shutter from moving from the closed position to the open position and the unlocked position where the blocking surface is positioned clear from the path of the shutter permitting the shutter to move from the closed position to the open position.

21. The toner container of claim 20, wherein the locking arm is spaced from the shutter when the lock is in the unlocked position and the shutter is in the open position.

22. The toner container of claim 20, wherein the locking arm contacts the shutter when the lock is in the unlocked position and the shutter is in the open position.

23. The toner container of claim 20, wherein the lock includes a camming surface for contacting a corresponding surface in the image forming device during insertion of the toner container into the image forming device and receiving an actuation force from the corresponding surface in the image forming device to move the lock from the locked position to the unlocked position.

24. The toner container of claim 23, wherein the camming surface is positioned on an engagement arm of the lock spaced apart from the locking arm.

25. The toner container of claim 24, wherein the engagement arm and the locking arm extend downward from the lock.

* * * * *